(12) United States Patent
Watson et al.

(10) Patent No.: US 6,922,293 B2
(45) Date of Patent: Jul. 26, 2005

(54) KINEMATIC OPTICAL MOUNTING ASSEMBLY WITH FLEXURES

(75) Inventors: Douglas C. Watson, Campbell, CA (US); Alton H. Phillips, Mountain View, CA (US); Masato Hatasawa, Kanagawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/229,051

(22) Filed: Aug. 28, 2002

(65) Prior Publication Data

US 2004/0008429 A1 Jan. 15, 2004

Related U.S. Application Data

(60) Provisional application No. 60/392,936, filed on Jul. 2, 2002.

(51) Int. Cl.[7] .................................................. G02B 7/02
(52) U.S. Cl. ...................... 359/819; 359/822; 359/823; 359/827
(58) Field of Search ................................ 359/819, 822, 359/823, 824, 825, 826, 811, 813, 815, 817, 827, 873, 876; 372/108

(56) References Cited

U.S. PATENT DOCUMENTS

| 4,681,408 A | 7/1987 | Ahmad et al. ............... 359/848 |
| 4,726,671 A | 2/1988 | Ahmad et al. ............... 359/848 |
| 4,733,945 A | 3/1988 | Bacich .......................... 359/820 |
| 4,854,671 A | 8/1989 | Hanke et al. ................. 359/820 |
| 4,929,073 A | 5/1990 | La Plante et al. ............ 359/848 |
| 5,249,082 A | 9/1993 | Newman ....................... 359/813 |
| 5,428,482 A | 6/1995 | Bruning et al. .............. 359/827 |
| 5,537,262 A | 7/1996 | Aoki et al. ................... 359/822 |
| 5,691,802 A | 11/1997 | Takahashi ..................... 355/53 |
| 5,986,827 A | 11/1999 | Hale ............................ 359/822 |
| 6,239,924 B1 | 5/2001 | Watson et al. ............... 359/819 |
| 6,242,065 B1 | 6/2001 | Blomberg et al. .......... 428/64.1 |
| 6,400,516 B1 | 6/2002 | Spinali ......................... 359/819 |
| 6,556,364 B2 * | 4/2003 | Meehan et al. .............. 359/822 |
| 6,661,499 B2 * | 12/2003 | Omura et al. ................. 355/71 |
| 2002/0163741 A1 | 11/2002 | Shibazaki |

FOREIGN PATENT DOCUMENTS

| EP | 0 989 434 A2 | 3/2000 |
| JP | 63-131110 | 6/1988 |

* cited by examiner

*Primary Examiner*—Timothy Thompson
(74) *Attorney, Agent, or Firm*—Finnegan, Henderson, Farabow, Garrett & Dunner, L.L.P.

(57) ABSTRACT

A kinematic optical mounting assembly secures an optical element to a base. A plurality of first bracket assemblies and second bracket assemblies are secured to the base and engage the optical element. Each first bracket assembly constrains the optical element from movement relative to the base in a direction substantially parallel to an axis of the base. Each second bracket assembly constrains the optical element from movement relative to the base in a direction substantially perpendicular to the axis of the base and substantially tangential to a periphery of the base. Six independent bracket assemblies constrain the optical element in six degrees of freedom to provide kinematic constraint without bending moments.

77 Claims, 12 Drawing Sheets

KINEMATIC OPTICAL MOUNTING ASSEMBLY WITH FLEXURES

This application claims benefit of priority of U.S. Provisional Patent Application No. 60/392,936, filed Jul. 2, 2002.

BACKGROUND OF THE INVENTION

1. Field of the Invention

The present invention relates to a mounting assembly for supporting an optical element and, more particularly, to a kinematic optical mounting assembly with flexures for supporting an optical element, such as a lens or a mirror, in a cell body.

2. Description of the Related Art

Conventional devices for manufacturing integrated circuits utilize a photolithographic process to reproduce a circuit pattern from a reticle (e.g., photomask) onto the surface of a wafer. In this process, radiant energy is transmitted through non-opaque portions of the reticle, through a projection exposure apparatus, and onto a surface of the wafer coated with photosensitized silicon or other semiconductor material. Conventional devices use visible and ultraviolet light as a radiant energy source. The portions of the wafer surface that are exposed to the light are cured. The uncured portion is then removed by an acid bath.

The resulting silicon layer is used to produce one layer of a multi-layered integrated circuit. A complete integrated circuit is formed by overlaying additional silicon layers on the existing layers. The overlay process involves recoating the wafer and repeating the exposure process using reticles with different circuit patterns.

A conventional projection exposure apparatus includes an optical barrel to carry a plurality of optical elements, such as lenses and/or mirrors, serially aligned along an optical axis of the barrel. Each optical element is mounted on a cell body. The combination of an optical element and a cell body is referred to as a cell. In conventional cells, the optical element is fastened to the cell body by chemical adhesives or friction clamping.

The attachment techniques used to secure optical elements in conventional cells pose several problems. In a photolithography system where an inert gas, such as nitrogen or helium, is introduced inside the optical barrel surrounding the cell assembly, the adhesive may release gas which could be harmful to the environment of the cell assembly. For example, the gas released from the adhesive may absorb the exposure light and hamper the exposure process.

One problem with conventional cells utilizing friction clamping is that the clamping force retains or pinches the optical element, which often causes the surface of the optical element to deform. Moreover, when the optical barrel is severely disturbed, such as when it is being shipped from the manufacturer's site to a production site, the clamping force may cause the optical element to break.

In light of the foregoing, there is a need for a kinematic optical mount and method for kinematically supporting the optical element in the cell that can apply an appropriate amount of force to constrain movement of the optical element without unduly altering the physical and chemical properties of the optical element.

SUMMARY OF THE INVENTION

To overcome the drawbacks of the prior art and in accordance with the purpose of the invention, as embodied and broadly described herein, one aspect of the invention relates to a kinematic optical mounting assembly for securing an optical element having a plurality of mounting projections. The kinematic optical mounting assembly comprises a base having a periphery and defining an axis. The kinematic optical mounting assembly further comprises a plurality of first bracket assemblies secured to the base. The first bracket assemblies are adapted to engage the optical element such that each first bracket assembly constrains the optical element from movement relative to the base in a direction substantially parallel to the axis. The kinematic optical mounting assembly further comprises a plurality of second bracket assemblies secured to the base. The second bracket assemblies are adapted to engage the optical element such that each second bracket assembly constrains the optical element from movement relative to the base in a direction substantially perpendicular to the axis and substantially tangential to the periphery of the base. The first bracket assemblies and the second bracket assemblies constrain the optical element in no more than six degrees of freedom.

In another aspect, the invention relates to a mounting assembly for mounting an optical element. The mounting assembly comprises a base having a periphery and defining an axis. The mounting assembly further comprises a plurality of first bracket assemblies secured to the base at substantially equal intervals. The first bracket assemblies are adapted to engage the optical element such that each first bracket assembly constrains the optical element from movement relative to the base in a direction substantially parallel to the axis. The mounting assembly further comprises a plurality of second bracket assemblies secured to the base at substantially equal intervals. The second bracket assemblies are adapted to engage the optical element such that each second bracket assembly constrains the optical element from movement relative to the base in a direction substantially perpendicular to the axis and substantially tangential to the periphery of the base. Each first bracket assembly and each second bracket assembly are independent of all other first bracket assemblies and second bracket assemblies.

In a further aspect, the invention relates to an optical assembly comprising an optical element having a peripheral edge and a plurality of mounting projections. The optical assembly further comprises a base having a periphery and defining an axis. The optical assembly further comprises a plurality of first bracket assemblies secured to the base. Each first bracket assembly comprises a bracket body engaging a respective mounting projection or the peripheral edge of the optical element and a bracket interface extending between the bracket body and the base. Each first bracket assembly constrains the optical element from movement relative to the base in a direction substantially parallel to the axis. The optical assembly further comprises a plurality of second bracket assemblies secured to the base. Each second bracket assembly comprises a bracket body engaging a respective mounting projection and a bracket interface extending between the bracket body and the base. Each second bracket assembly constrains the optical element from movement relative to the base in a direction substantially perpendicular to the axis and substantially tangential to the periphery of the base. The first bracket assemblies and the second bracket assemblies constrain the optical element in no more than six degrees of freedom.

Advantages of the invention will be set forth in part in the description that follows. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several exemplary embodiments of the invention and together with the description, serve to explain the principles of the invention. In the drawings.

DETAILED DESCRIPTION OF EXEMPLARY EMBODIMENTS

Figure 1:
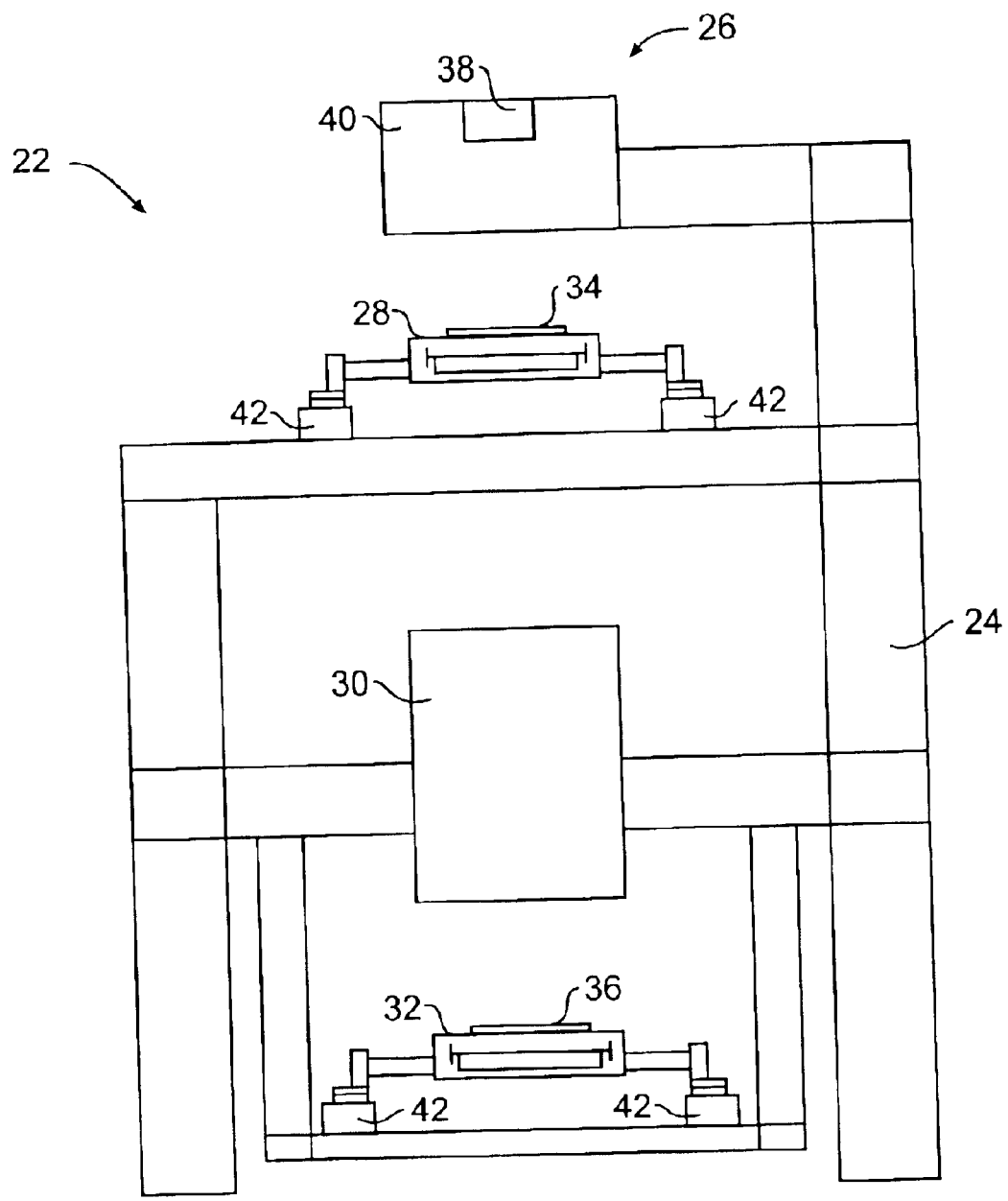
FIG. 1 is a front elevation showing a photolithography device utilizing the kinematic optical mounting assembly of the present invention.

Reference will now be made in detail to several exemplary embodiments of the invention that are illustrated in the accompanying drawings. Wherever possible, the same reference numbers will be used throughout the drawings to refer to the same or like parts.

The kinematic optical mounting assembly of the present invention will be described with reference to a photolithography device 22 shown in FIG. 1. As shown, photolithography device 22 includes an apparatus frame 24 supporting the components of the system, including an illumination system 26, a reticle stage 28, an optical barrel 30, and a wafer stage 32. Apparatus frame 24 is rigid and mounts to a base, such as the floor or another supporting structure. The design of apparatus frame 24 may vary to suit the design requirements for the rest of photolithography device 22. For example, separate individual structures (not shown) may be used to support the components of the system.

In operation, photolithography device 22 utilizes illumination system 26 to transfer a pattern of an integrated circuit from a reticle 34 mounted on reticle stage 28, through optical barrel 30, and onto a semiconductor wafer 36 mounted on wafer stage 32. This process is described in detail below.

Illumination system 26 includes an illumination source 38 and an illumination optical assembly 40, as shown in FIG. 1. Illumination source 38 emits a beam of light energy. Illumination optical assembly 40 guides the beam of light energy from illumination source 38 to optical barrel 30. The beam selectively illuminates different portions of reticle 34 and exposes wafer 36. In FIG. 1, illumination source 38 is illustrated as being supported above reticle stage 28. Alternatively, illumination source 38 can be secured to one of the sides of apparatus frame 24 and the energy beam from illumination source 38 can be directed above reticle stage 28 with illumination optical assembly 40.

Illumination source 38 can be a g-line laser (436 nm), an i-line laser (365 nm), a KrF excimer laser (248 nm), an ArF excimer laser (193 nm), or an $F_2$ laser (157 nm). Alternatively, illumination source 38 can use a charged particle beam, such as an x-ray or an electron beam. In the case where an electron beam is used, thermionic emission-type lanthanum hexaboride ($LaB_6$) or tantalum (Ta) can be used as an electron gun. Further, in the case where an electron beam is used, the structure can be such that either a reticle is used, or a pattern is formed directly on the wafer without the use of a reticle.

Reticle stage 28 holds and precisely positions reticle 34 relative to optical barrel 30 and wafer 36.

Optical barrel 30 projects and/or focuses the light passing through reticle 34 to wafer 36. Depending upon the design of photolithography device 22, optical barrel 30 can magnify or reduce the image illuminated on reticle 34. Optical barrel 30 can also be a 1× magnification system.

With respect to optical barrel 30, when an excimer laser having far ultra-violet rays is used, glass materials, such as quartz and fluorite that transmit far ultra-violet rays, are preferably used. When an $F_2$ type laser or an x-ray is used, optical barrel 30 preferably should be either catadioptric or reflective (a reticle should also preferably be a reflective type), and when an electron beam is used, electron optics preferably should comprise electron lenses and deflectors. The optical path for the electron beams should be in a vacuum.

Also, with an illumination optical assembly that employs vacuum ultra-violet radiation (VUV) of wavelength 200 nm or lower, use of the catadioptric type optical system can be considered. Examples of the catadioptric type of optical system are disclosed in U.S. Pat. No. 5,668,672, as well as U.S. Pat. No. 5,835,275. In these cases, the reflecting optical device can be a catadioptric optical system incorporating a beam splitter and a concave mirror. The optical system disclosed in U.S. Pat. No. 5,689,377, as well as Japanese Patent Application Disclosure No. 10-3039, also use a reflecting-refracting type of optical system incorporating a concave mirror, but without a beam splitter, and can also be employed with this invention. The disclosures in the above mentioned U.S. patents, as well as the Japanese patent application published in the Official Gazette for Laid-Open Patent Applications, are incorporated herein by reference.

Wafer stage 32 holds and positions wafer 36 with respect to the projected image of the illuminated portions of reticle 34. In the embodiment illustrated in FIG. 1, wafer stage 32 and reticle stage 28 are positioned by a plurality of motors 42. Depending upon the design, the apparatus can also include additional servo drive units, linear motors, and planar motors to move wafer stage 32 and reticle stage 28.

When linear motors (see U.S. Pat. Nos. 5,623,853 or 5,528,118) are used in a wafer stage or a reticle stage, the linear motors can be either an air levitation type employing air bearings or a magnetic levitation type using Lorentz force or reactance force. Additionally, the stage can move along a guide, or it can be a guideless-type stage. The disclosures in U.S. Pat. Nos. 5,623,853 and 5,528,118 are incorporated herein by reference.

Alternatively, a stage can be driven by a planar motor, which drives the stage by the electromagnetic force generated by a magnet unit having two-dimensionally arranged magnets and an armature coil unit having two-dimensionally arranged coils in facing positions. With this type of driving system, either one of the magnet unit or the armature coil unit is connected to the stage and the other unit is mounted on the moving plane side of the stage.

Movement of the stages, as described above, generates reaction forces which can affect performance of the photolithography system. Reaction forces generated by the wafer stage motion can be released mechanically to the floor by the use of a frame member as described in U.S. Pat. No. 5,528,118. Additionally, reaction forces generated by the reticle stage motion can be mechanically released to the floor by use of a frame member as described in U.S. Pat. No. 5,874,820. The disclosure in U.S. Pat. No. 5,874,820 is incorporated herein by reference.

There are several different types of photolithography devices. For example, photolithography device 22 can be used as a scanning type photolithography system which exposes the pattern from reticle 34 onto wafer 36 with reticle 34 and wafer 36 moving synchronously. In a scanning type lithographic device, reticle 34 is moved perpendicularly to an optical axis of optical barrel 30 by reticle stage 28 and wafer 36 is moved perpendicularly to an optical axis of optical barrel 30 by wafer stage 32. Scanning of reticle 34 and wafer 36 occurs while reticle 34 and wafer 36 are moving synchronously.

Alternatively, photolithography device 22 can be a step-and-repeat type photolithography system, or stepper, that exposes reticle 34 while reticle 34 and wafer 36 are stationary. Wafer 36 used with a stepper system has multiple dies arranged on the surface of the wafer. In the step-and-repeat process, the image on reticle 34 is sequentially exposed onto each of the dies. Between exposure steps, computer-controlled wafer stage 32 sequentially advances wafer 36 perpendicularly to the optical axis of optical barrel 30 so that the next die is brought into position relative to optical barrel 30 and reticle 34 for exposure.

Optical barrel 30 houses a plurality of optical elements, such as lenses and/or mirrors. Each optical element is arranged on a base, known as a cell body. The combination of an optical element and a cell body is known as a cell. The arrangement of multiple cells within the optical barrel forms a cell assembly.

According to the present invention, a kinematic optical mounting assembly 44 is used to secure an optical element on a cell body. Several exemplary embodiments of kinematic optical mounting assembly 44 of the present invention will be described with reference to FIGS. 2–11.

As used herein, "kinematic" means constrained in only 6 degrees of freedom. For example, with regard to a rectangular coordinate system having three mutually orthogonal axes (e.g., X, Y, and Z), kinematic constraint implies constraint along the X, Y, and Z axes, as well as constraint in rotational directions around the X, Y, and Z axes ($\theta_X$, $\theta_Y$, and $\theta_Z$, respectively). When a body, such as an optical element, is kinematically constrained, bending moments cannot be applied to the body.

Figure 2:
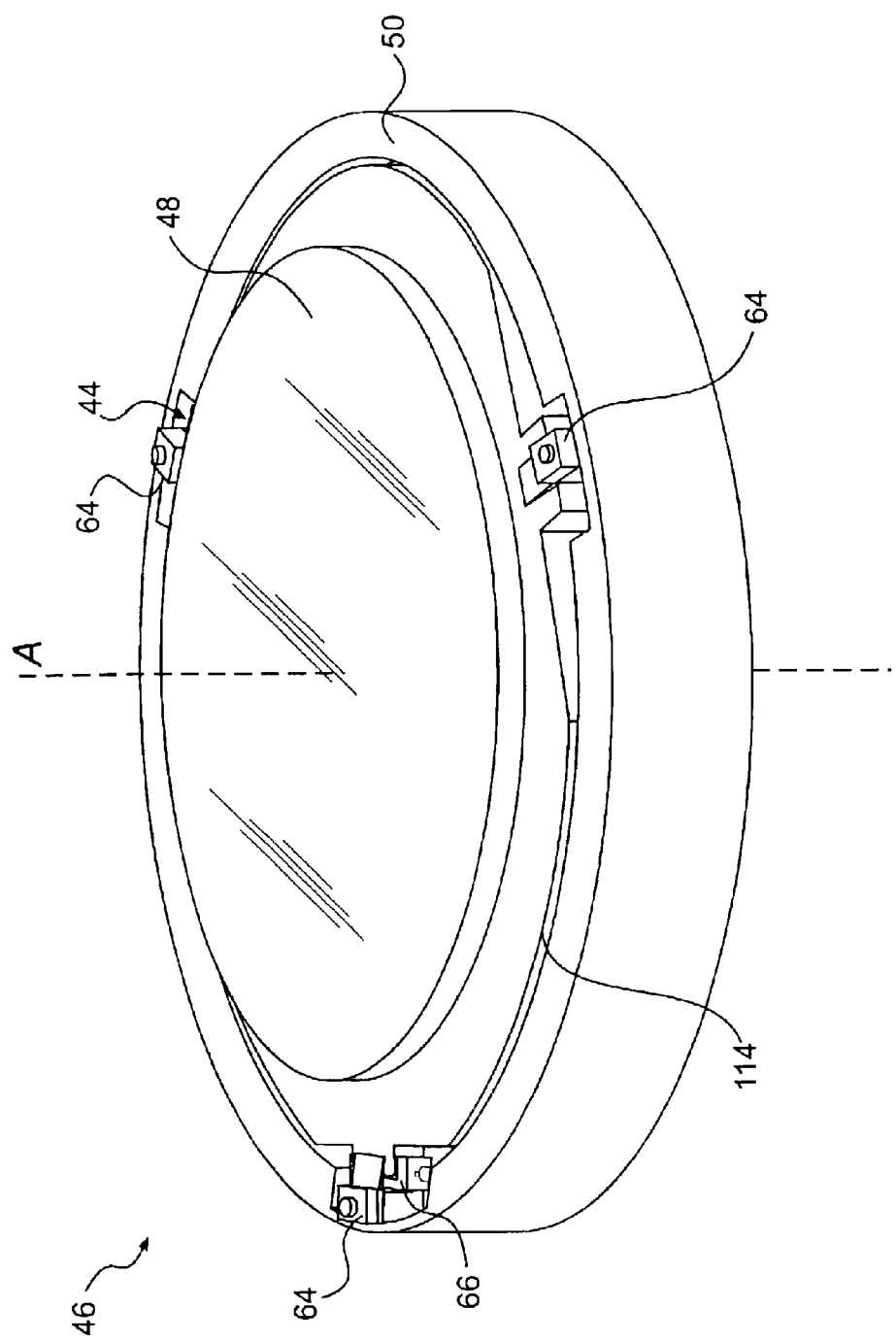
FIG. 2 is a perspective view showing an exemplary embodiment of a cell utilizing the kinematic optical mounting assembly of the present invention.

An exemplary embodiment of a cell 46 incorporating the kinematic optical mounting assembly 44 of the present invention is shown in FIG. 2. As shown, kinematic optical mounting assembly 44 secures a lens 48 to a cell body 50. Kinematic optical mounting assembly 44 in this embodiment comprises a plurality of brackets spaced on cell body 50.

Figure 3:
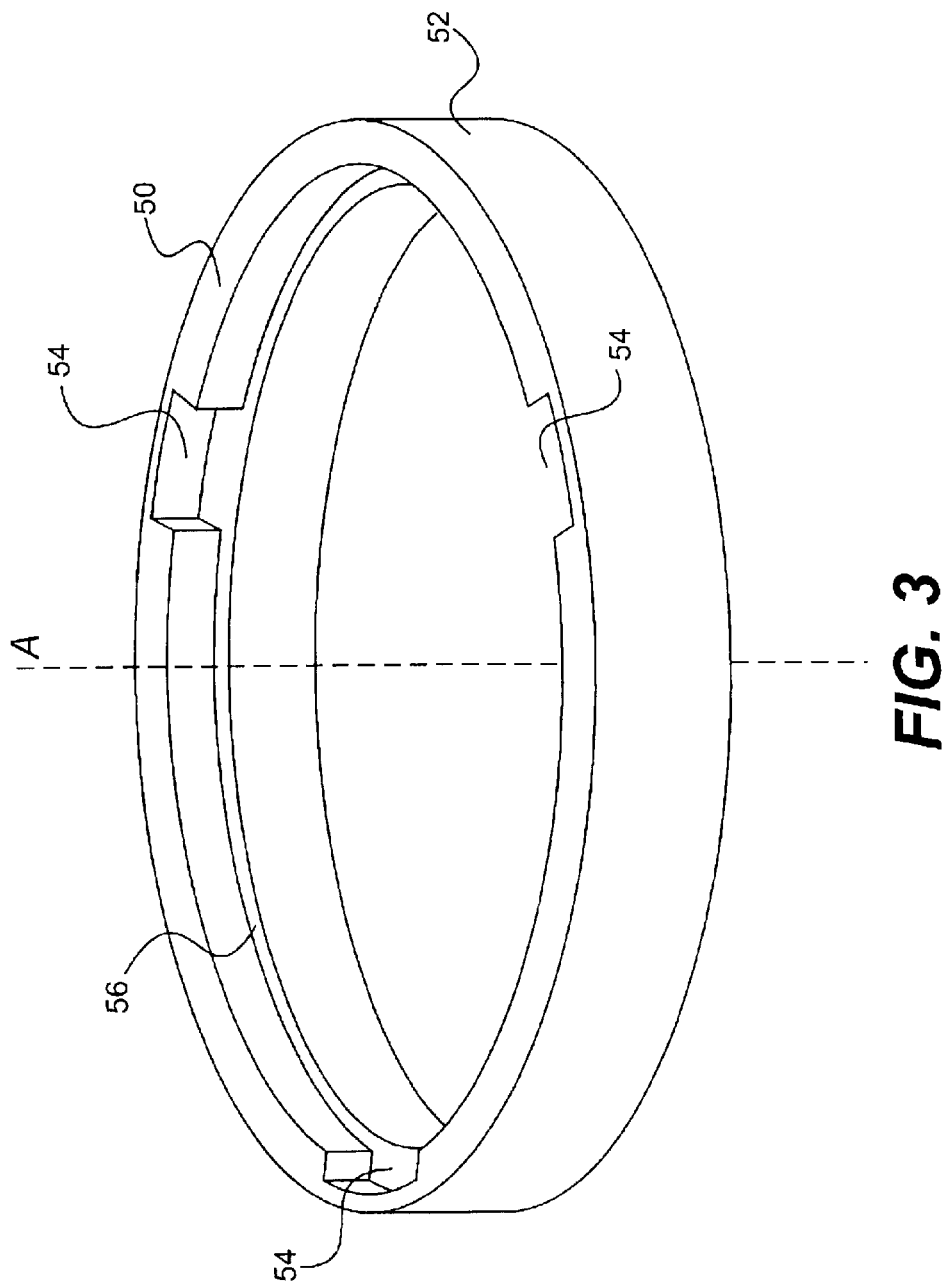
FIG. 3 is a perspective view showing an exemplary embodiment of a cell body of the present invention.

An exemplary embodiment of a cell body 50 according to the present invention is shown in FIG. 3. In this embodiment, cell body 50 has a substantially annular shape, but other shapes may be used. Cell body 50 has a periphery 52 and defines an axis A. A plurality of recesses 54 are formed on an inner circumference of the cell body. Three substantially equally spaced recesses 54 are shown in the illustrated embodiment, but other numbers of recesses 54 may be used. A portion of cell body 50 having a reduced diameter forms a ledge 56 along the inner circumference.

Figure 4:
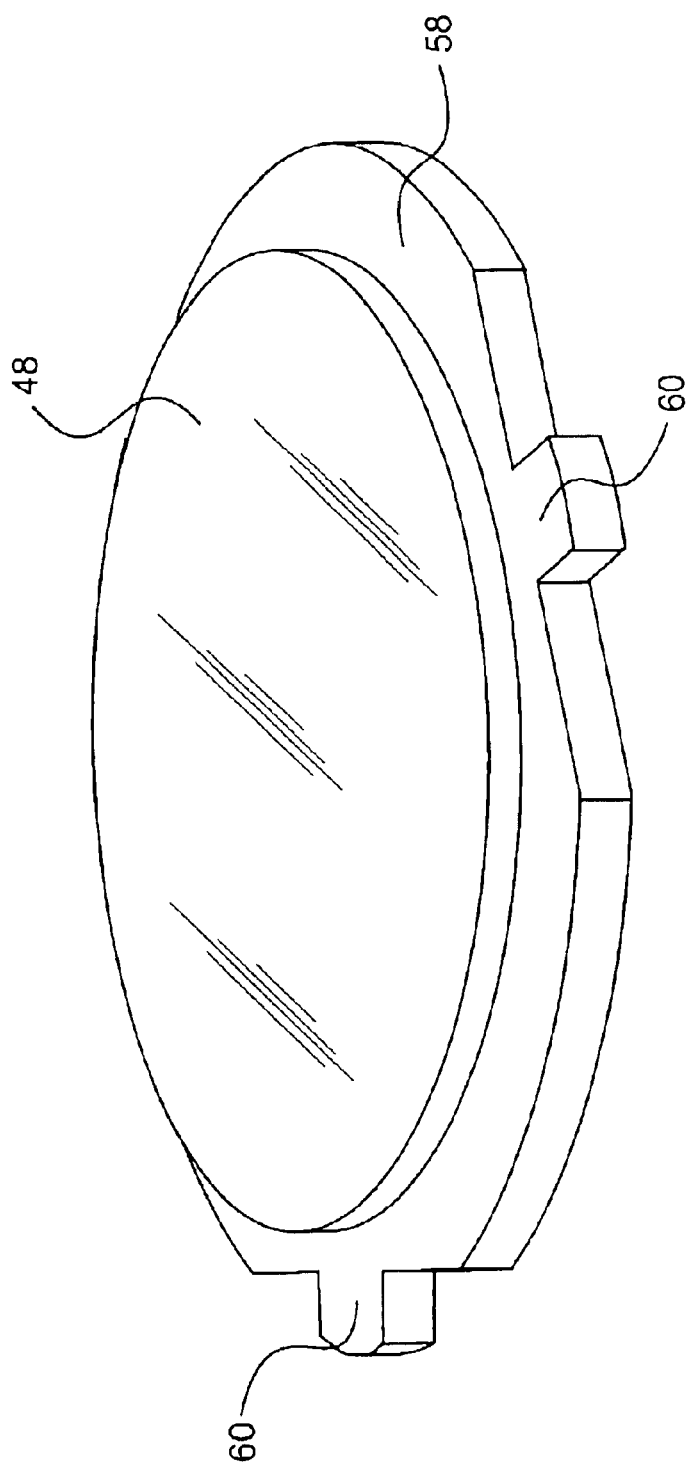
FIG. 4 is a perspective view showing a lens suitable for use with the kinematic optical mounting assembly of the present invention.

A lens 48 suitable for use with kinematic optical mounting assembly 44 of the present invention is shown in FIG. 4. Lens 48 has a substantially circular shape with a peripheral edge 58 and three substantially equally spaced mounting projections 60 arranged on an outer circumference thereof. When lens 48 is assembled with cell body 50, mounting projections 60 are received in recesses 54 on cell body 50.

Figure 5:
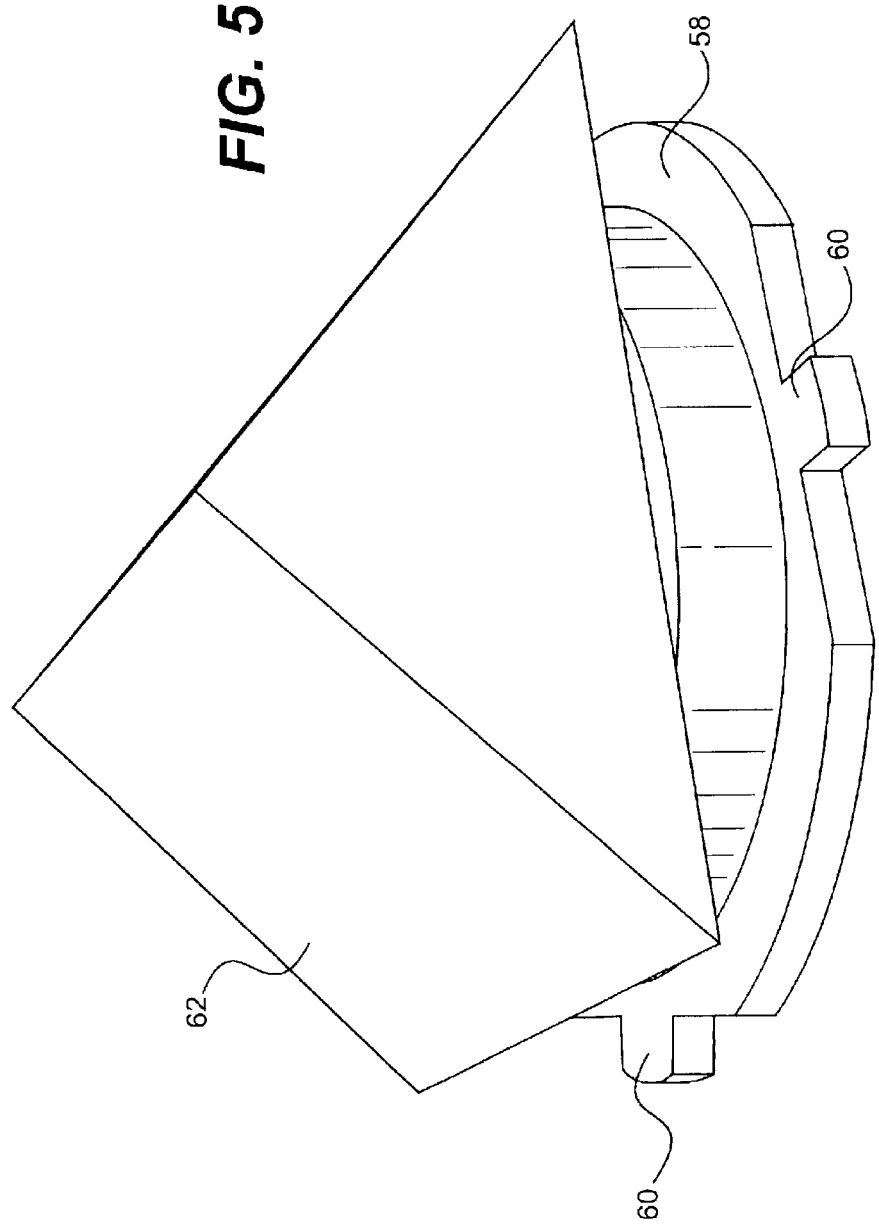
FIG. 5 is a perspective view showing a mirror suitable for use with the kinematic optical mounting assembly of the present invention.

A mirror 62 suitable for use with the kinematic optical mounting assembly 44 of the present invention is shown in FIG. 5. Mirror 62 is a bi-reflective mirror used in a catadioptric system, described above. As shown, mirror 62 is provided with a similar interface structure, comprising a peripheral edge 58 and three substantially equally spaced mounting projections 60 arranged on an outer circumference. Mounting projections 60 are received in recesses 54 of the cell body 50 when mirror 62 and cell body 50 are assembled.

The kinematic optical mounting assembly 44 of the present invention may be used with a variety of optical elements, including conventional lenses and/or mirrors. Lens 48 and mirror 62 shown are exemplary illustrations only. Other optical elements may also be used.

In the embodiment shown in FIG. 2, first and second bracket assemblies 64, 66 are collocated at each of three recesses 54 on cell body 50, for a total of six bracket assemblies. First bracket assembly 64 and second bracket assembly 66 are shown mounted in a recess 54 on cell body 50 in FIG. 6. First bracket assembly 64 and second bracket assembly 66 are mounted independently on cell body 50, i.e., not in contact with each other, to provide support to lens 48.

Figure 6:
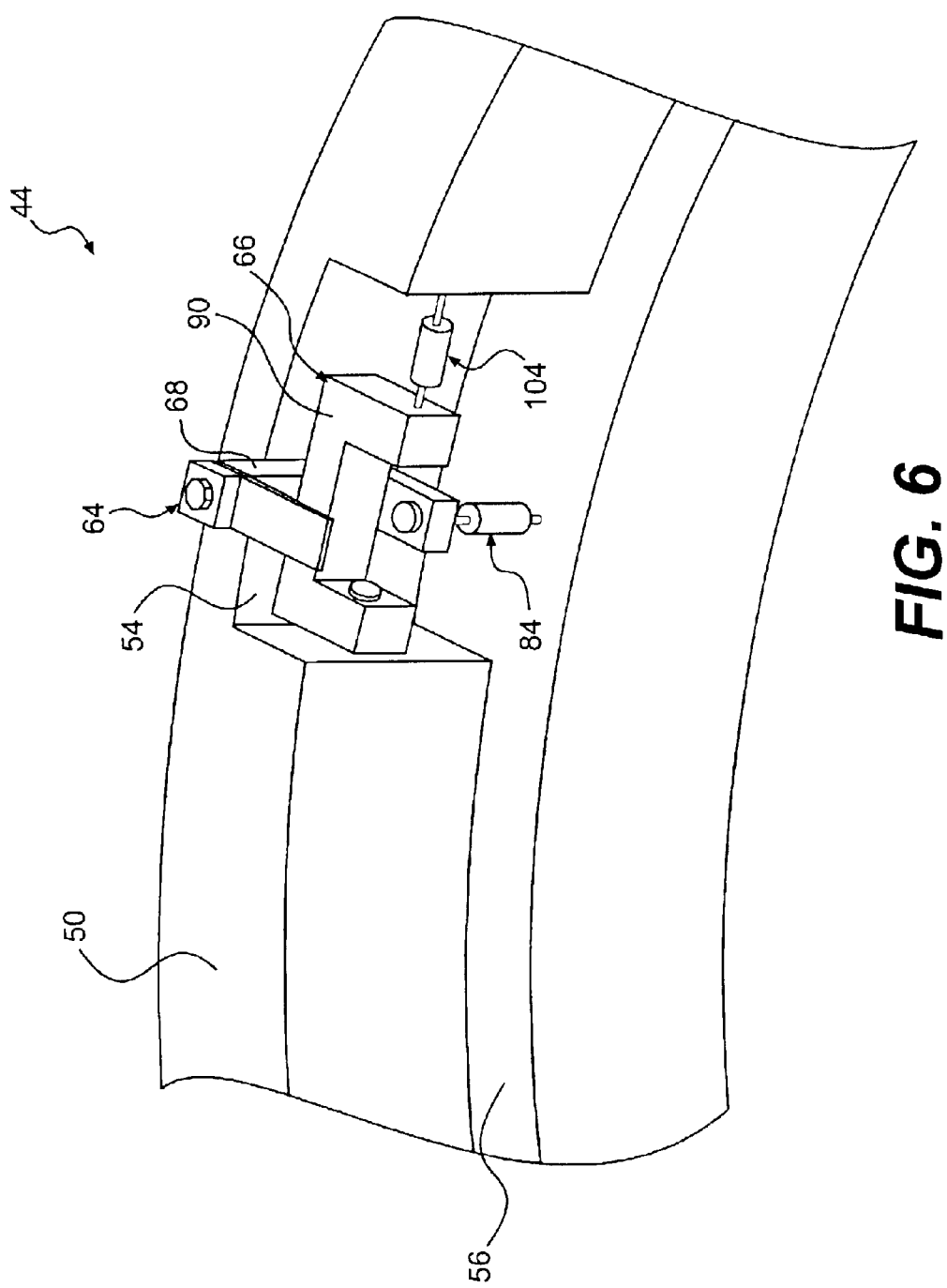
FIG. 6 is an enlarged fragmentary perspective showing details of an exemplary embodiment of an axial bracket assembly and an exemplary embodiment of a tangential bracket assembly installed in a recess on a cell body of the present invention.

In the embodiment of FIGS. 2 and 6, each first bracket assembly 64 engages a respective mounting projection 60 to constrain optical element 48, 62 from movement relative to cell body 50 in a direction substantially parallel to axis A. Each second bracket assembly 66 engages a mounting projection 60 to constrain optical element 48, 62 from movement relative to cell body 50 in a direction substantially perpendicular to axis A and substantially tangential to periphery 52 of cell body 50. The interaction between bracket assemblies 64, 66 and optical element 48, 62 is described in more detail below.

Figure 7:
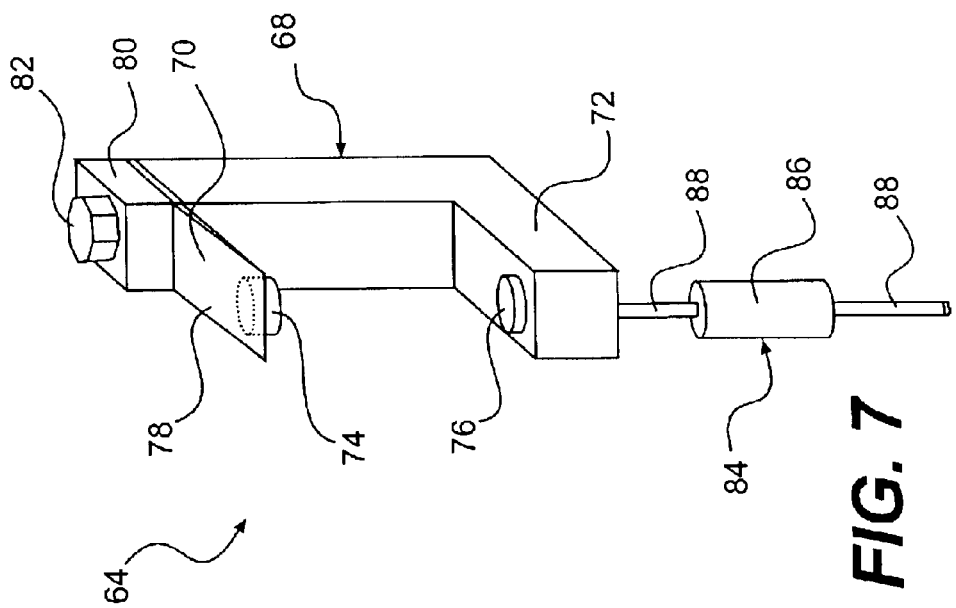
FIG. 7 is a perspective view showing an exemplary embodiment of an axial bracket assembly of the present invention.
Figure 9:
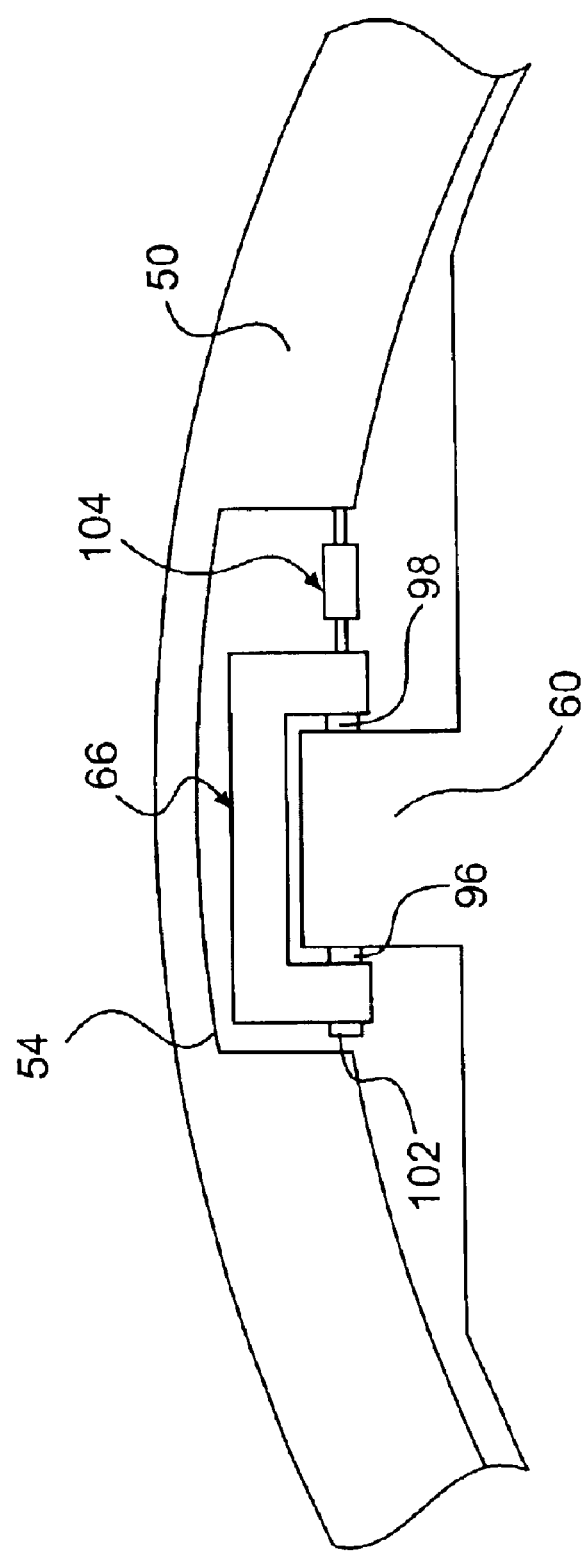
FIG. 9 is an enlarged fragmentary perspective showing details of an optical element secured to a cell body with an exemplary embodiment of a tangential bracket assembly of the present invention.

An exemplary embodiment of first bracket assembly 64 is shown in FIG. 7. First bracket assembly comprises a bracket body 68. Bracket body 68 has a first arm 70 and a second arm 72. A clamping block 74 is disposed on first arm 70 and a seat 76 is disposed on second arm 72. Clamping block 74 and seat 76 are attached to respective bracket arms 70, 72 using conventional attachment means. In an alternative embodiment, clamping block 74 may be unattached to first arm 70 and instead may be held in place by clamping pressure only or by another locating means, as described in U.S. Pat. No. 6,239,924. In a further embodiment, first arm 70 may be replaced by a clamp spring, as described in U.S. Pat. No. 6,239,924. The disclosure in U.S. Pat. No. 6,239,924 is incorporated herein by reference.

Clamping block 74 and seat 76 are provided with substantially flat surfaces for engaging respective surfaces of optical element 48, 62. Clamping block 74 and seat 76 of each first bracket assembly 64 engage first opposing surfaces of respective mounting projections 60 to constrain optical element 48, 62 in the direction substantially parallel to axis A.

First arm 70 comprises an elastic element to bias clamping block 74 towards seat 76. In the embodiment shown, a leaf spring 78 is used to provide the biasing force, but other spring arrangements may also be used. As shown, leaf spring 78 is attached to an upper surface of bracket 68 using a mounting block 80 and a threaded fastener 82. Other attachment means may also be used. The spring force may be varied by using clamping blocks 74 of different sizes. Thus, when a larger clamping block 74 is placed between leaf spring 78 and optical element 48, 62, leaf spring 78 experiences a larger deflection and, therefore, provides a greater biasing force.

First bracket assembly 64 also comprises a bracket interface 84, comprising a constraint member 86 and at least one flexure 88. Two flexures 88 are shown in the embodiment of FIG. 5, but other numbers of flexures 88 may be used. In first bracket assembly 64, clamping block 74, seat 76, and bracket interface 84 are substantially aligned, such that bracket interface 84 is substantially normal to seat 76.

Figure 8:
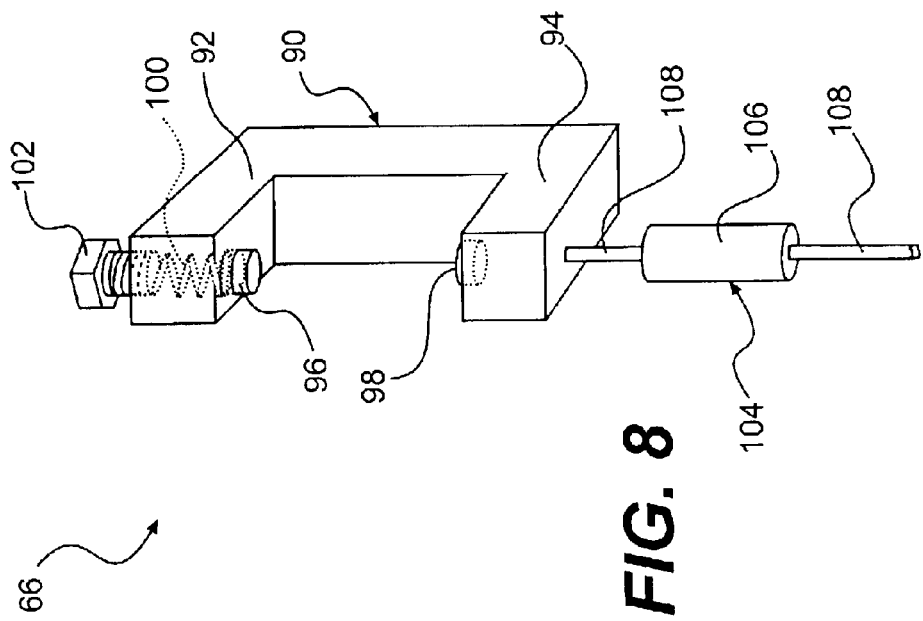
FIG. 8 is a perspective view showing an exemplary embodiment of a tangential bracket assembly of the present invention.

An exemplary embodiment of a second bracket assembly 66 is shown in FIG. 8. Second bracket assembly 66 comprises a bracket body 90. Bracket body 90 has a first arm 92 and a second arm 94. A clamping block 96 is disposed on first arm 92 and a seat 98 is disposed on second arm 94.

Clamping block 96 and seat 98 of second bracket assembly 66 are provided with substantially flat surfaces for engaging respective surfaces of optical element 48, 62. Clamping block 96 and seat 98 of each second bracket assembly 66 engage second opposing surfaces of respective mounting projections 60 to constrain optical element 48, 62 in the direction substantially perpendicular to axis A and substantially tangential to periphery 52 of cell body 50. A second bracket assembly 66 is shown engaging a mounting projection 60 in FIG. 9.

First arm 92 comprises an elastic element to bias clamping block 96 towards seat 98. In the embodiment shown, a helical spring 100 is arranged within an opening in first arm 92 between clamping block 96 and a threaded fastener 102. In this embodiment, the spring force may be varied by adjusting threaded fastener 102. Thus, the clamping force applied to optical element 48, 62 may be adjusted as desired.

It is noted that various spring arrangements may be used with first arm 70, 92 of each bracket assembly 64, 66 to provide the biasing force on clamping block 74, 96. Thus, in an alternative embodiment, a helical spring arrangement may be used with the bracket assembly 64 and a leaf spring arrangement may be used with second bracket assembly 66. In addition, other arrangements using other types of springs, including Belleville springs, and/or combinations of other elastic elements may be used with each embodiment.

Second bracket assembly 66 also comprises a bracket interface 104, comprising a constraint member 106 and at least one flexure 108. Two flexures 108 are shown in the embodiment of FIG. 8, but other numbers of flexures 108 may be used. In second bracket assembly 66, clamping block 96, seat 98, and bracket interface 104 are substantially aligned, such that bracket interface 104 is substantially normal to seat 98.

In each bracket assembly 64, 66, bracket body 68, 90 is secured to cell body 50 through bracket interface 84, 104, as shown in FIG. 6. In particular, a first flexure 88, 108 extends between bracket body 68, 90 and constraint member 86, 106 and a second flexure 88, 108 extends between constraint member 86, 106 and cell body 50.

In the embodiments of FIGS. 7 and 8, first flexure 88, 108 is secured to second arm 72, 94 of bracket 68, 90 of each bracket assembly 64, 66. However, first flexure 88, 108 may alternatively be connected to other portions of bracket body 68, 90.

Flexures 88, 108 are attached to bracket bodies 68, 90, constraint members 86, 106, and cell body 50 using conventional attachment means. It is noted that bracket bodies 68, 90, flexures 88, 108, constraint members 86, 106, and cell body 50 may be formed from a variety of metals, including brass, stainless steel, and INVAR.

Bracket interface 84, 104 of each bracket assembly, including constraint member 86, 106 and flexures 88, 108, provides a connection having a relatively high stiffness in one degree of freedom and a relatively low stiffness in five degrees of freedom. As used herein, "relatively high stiffness" means a stiffness sufficient to constrain the lens position relative to the cell body and to support the loads typically encountered by bracket assembly 64, 66. As used herein, "relatively low stiffness" means a stiffness insufficient to support the loads typically encountered by bracket assembly 64, 66, i.e., essentially flexible.

The stiff degree of freedom of each bracket interface 84, 104 corresponds to the direction of the constraint provided by respective bracket assembly 64, 66 on optical element 48, 62. For example, in the embodiment of FIGS. 2 and 6, bracket interface 84 of first bracket assembly 64 provides a relatively high stiffness in a direction substantially parallel to axis A. Further, bracket interface 104 of second bracket assembly 66 provides a relatively high stiffness in a direction substantially perpendicular to axis A and substantially tangential to cell body 50.

Thus, each bracket assembly 64, 66 provides support to optical element 48, 62 in a single degree of freedom. Because there are six bracket assemblies 64, 66 arranged on cell body 50, kinematic optical mounting assembly 44 of the present invention kinematically constrains optical element 48, 62 in only six degrees of freedom. As a result, harmful bending moments on optical element 48, 62, which could bend and/or distort optical element 48, 62, may be substantially avoided. This is true for moments due to external forces, as well as moments due to misalignment of a clamping block 74, 96 and a seat 76, 98. Because each bracket assembly 64, 66 is constrained by a one degree of freedom bracket interface 84, 104, bracket assembly 64, 66 cannot exert a moment on optical element 48, 62.

In addition, both bracket assemblies 64, 66 at each mounting location provide low stiffness and, therefore, flexibility in a radial direction (see FIG. 6). This radial flexibility may accommodate deflections at the mounting locations due to differential expansion between optical element 48, 62 and cell body 50, thereby preventing damage to and minimizing deformation of optical element 48, 62.

Figure 10:
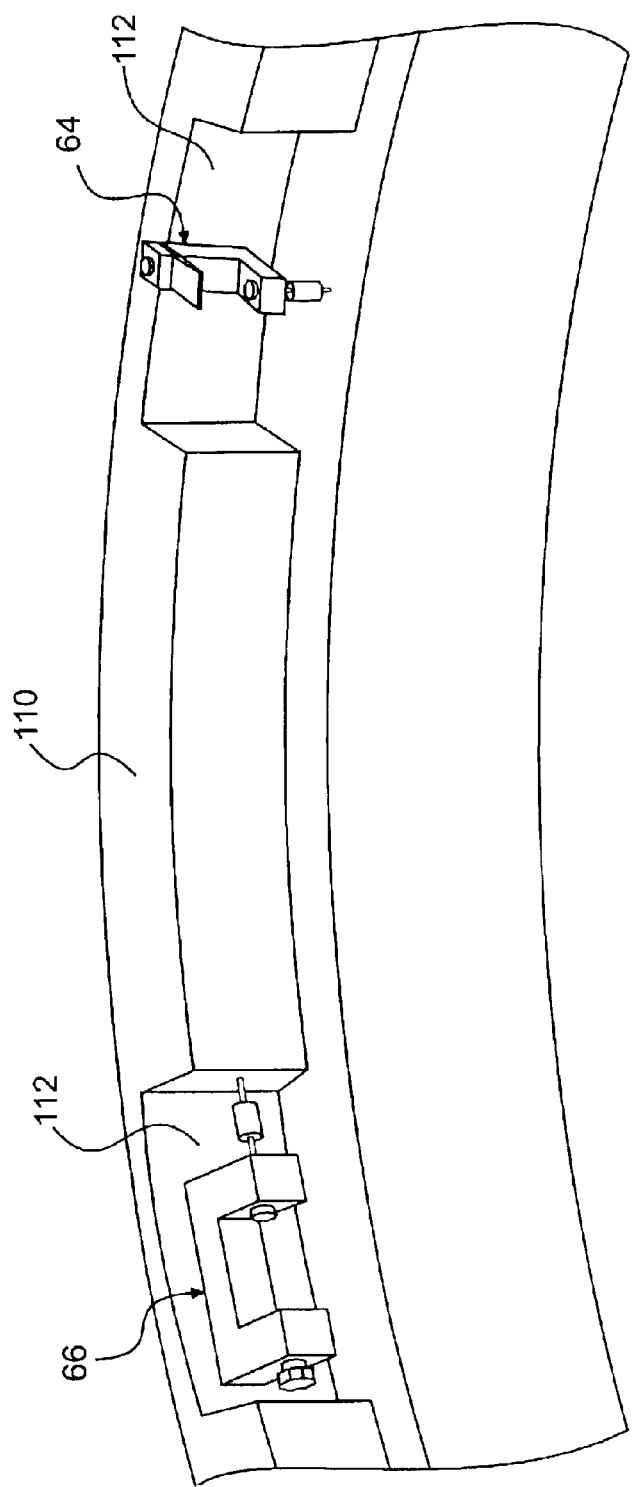
FIG. 10 is an enlarged fragmentary perspective showing details of an exemplary embodiment of a tangential bracket assembly and an exemplary embodiment of an axial bracket assembly installed in separate recesses on a cell body of the present invention.

In another exemplary embodiment of kinematic optical mounting assembly 44 of the present invention, second bracket assemblies 66 are spaced at substantially equal intervals and contact optical element 48, 62 at mounting projections 60. First bracket assemblies 64 in this embodiment are spaced at substantially equal intervals from each other and from second bracket assemblies 66. First bracket assemblies 64 contact optical element 48, 62 at locations on peripheral edge 58. FIG. 10 shows a portion of a cell body 110 of this embodiment with a first bracket assembly 64 and a second bracket assembly 66 independently mounted in separate recesses 112.

Figure 11:
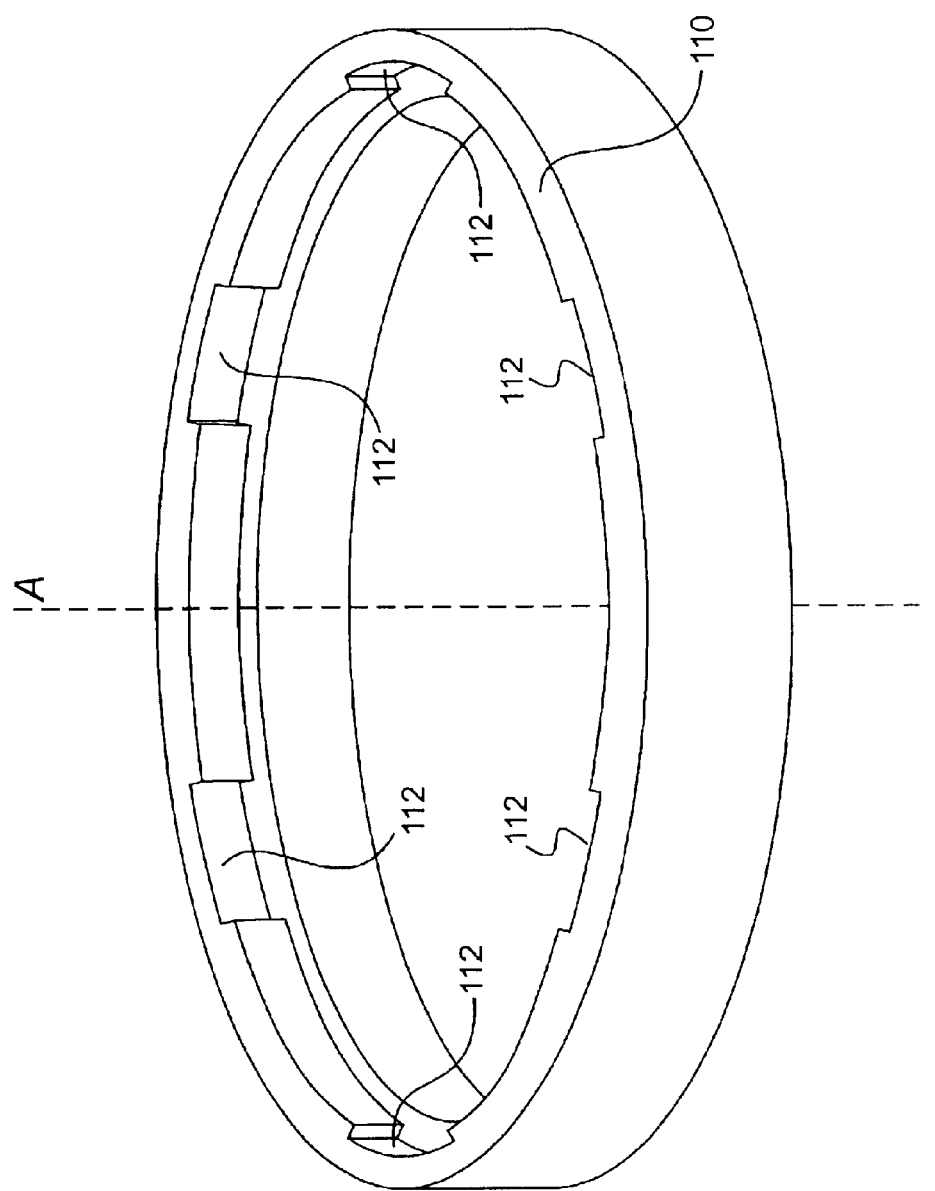
FIG. 11 is a perspective view showing another exemplary embodiment of a cell body of the present invention.

An exemplary embodiment of a cell body 110 used with this arrangement is shown in FIG. 11. Cell body 110 comprises six substantially equally spaced recesses 112 to accommodate six substantially equally spaced bracket assemblies 64, 66. Optical element 48, 62 (not shown) is arranged so that each second bracket assembly 66 engages opposing surfaces of a respective mounting projection 60 and each first bracket assembly 64 engages opposing surfaces of peripheral edge 58 of optical element 48, 62. In this embodiment, therefore, optical element 48, 62 is kinematically supported by six bracket assemblies 64, 66 in six degrees of freedom.

The kinematic optical mounting assembly 44 of the present invention has been described for use with a plurality of cells 46 in an optical barrel 30 of a photolithography system 22. However, this mounting system may be used with any number of cells 46 in any other application where kinematic mounting of an optical element is desired.

Figure 12:
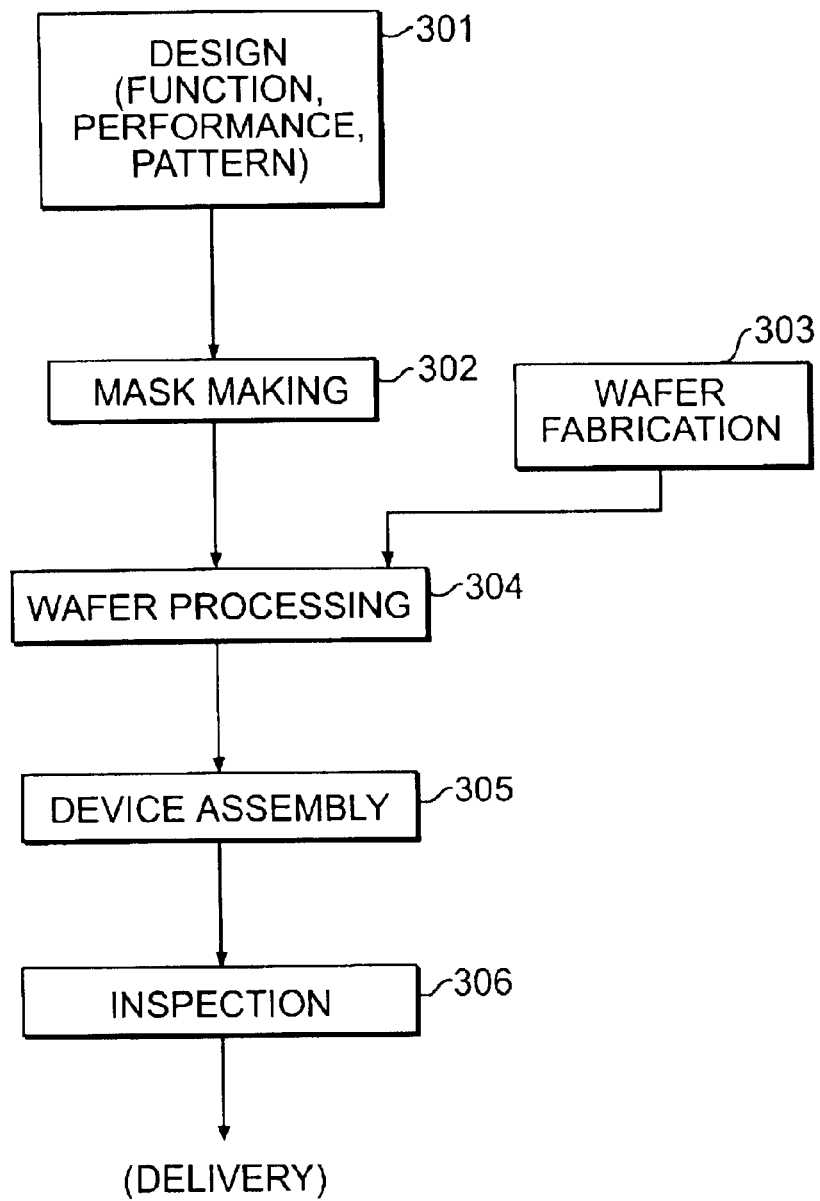
FIG. 12 is a flow chart outlining a process for manufacturing a semiconductor wafer consistent with the principles of the present invention.

The process of fabricating semiconductor devices will now be described with reference to the flowchart of FIG. 12. In step 301 the device's function and performance characteristics are designed. Next, in step 302, a reticle having a pattern is designed according to the previous designing step, and in a parallel step 303, a wafer is made from a silicon material. The reticle pattern designed in step 302 is exposed onto the wafer from step 303 in step 304 by a photolithography system described hereinabove consistent with the principles of the present invention. In step 305 the semiconductor device is assembled (including the dicing process, bonding process and packaging process). Finally, the device is inspected in step 306.

Figure 13:
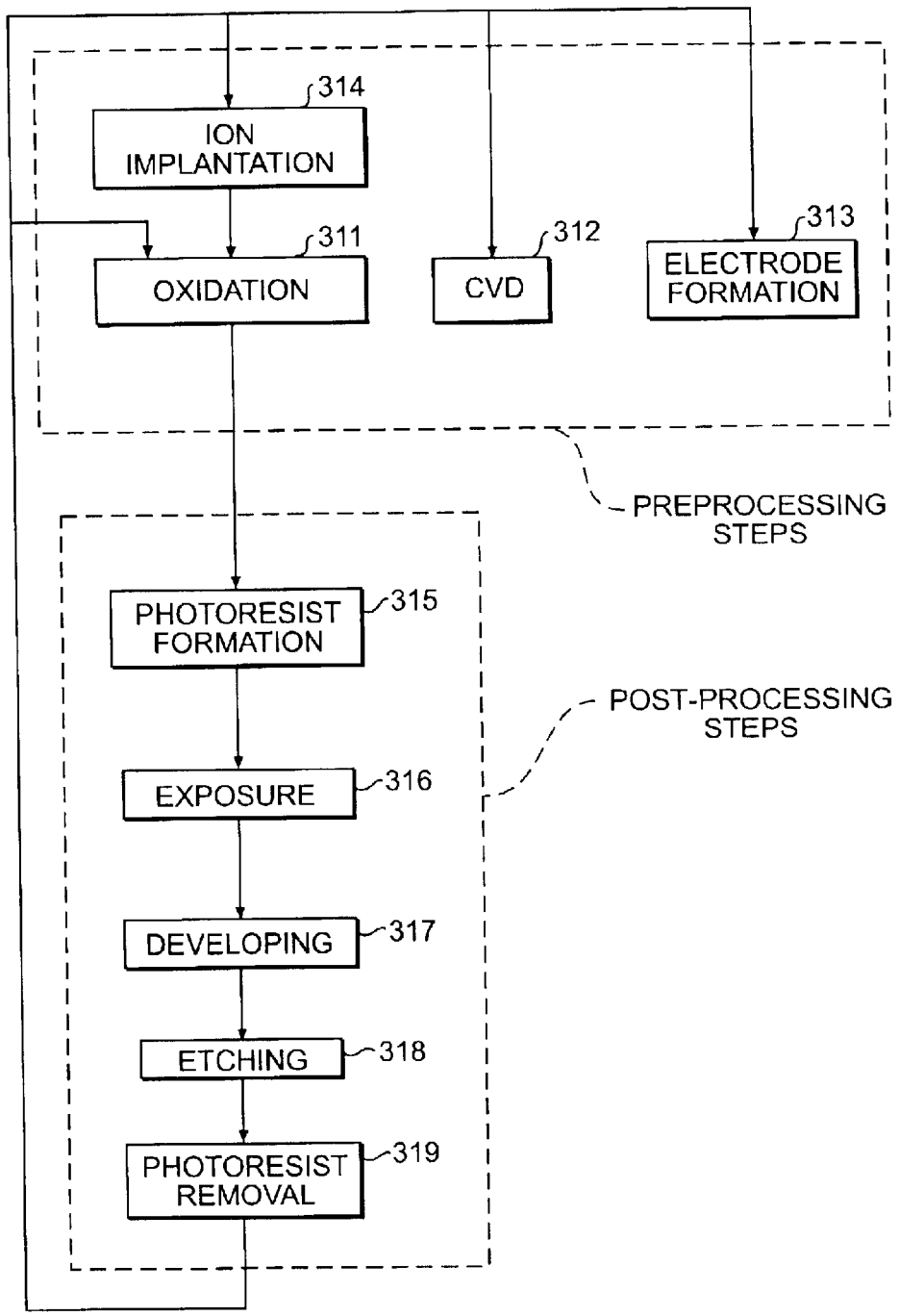
FIG. 13 is a flow chart outlining the semiconductor manufacturing process in more detail.

In the case of fabricating semiconductor devices, step 304 includes the additional steps detailed in the flowchart of FIG. 13. In step 311 (oxidation step), the wafer surface is oxidized. In step 312 (CVD step), an insulation film is formed on the wafer surface. In step 313 (electrode formation step), electrodes are formed on the wafer by vapor deposition. In step 314 (ion implantation step), ions are implanted in the wafer. The above mentioned steps 311–314 form the preprocessing steps for wafers during wafer processing, and selection is made at each step according to processing requirements.

At each stage of wafer processing, when the above mentioned preprocessing steps have been completed, the following post-processing steps are implemented. During post-processing, initially, in step 315 (photoresist formation step), a photoresist is applied to a wafer. Next, in step 316, (exposure step), the above mentioned exposure device is used to transfer the circuit pattern of a reticle to a wafer. Then, in step 317 (developing step), the exposed wafer is developed, and in step 318 (etching step), parts other than residual photoresist (exposed material surface) are removed by etching. In step 319 (photoresist removal step), unnecessary photoresist remaining after etching is removed. Multiple circuit patterns are formed by repetition of these preprocessing and post-processing steps.

The use of the photolithography device provided herein is not limited to a photolithography system for manufacturing semiconductors. The photolithography device, for example, can be used as an LCD photolithography system that exposes a liquid crystal display device pattern onto a rectangular glass plate or a photolithography system for manufacturing a thin film magnetic head.

A photolithography system according to the above described embodiments can be built by assembling various subsystems, including each element listed in the appended claims, in such a manner that the prescribed mechanical accuracy, electrical accuracy and optical accuracy are maintained. In order to maintain the various accuracies, prior to and following assembly, every optical system is adjusted to achieve its optical accuracy. Similarly, every mechanical system and every electrical system are adjusted to achieve their respective mechanical and electrical accuracies. The process of assembling each subsystem into a photolithography system includes integrating mechanical interfaces, electrical circuit wiring connections and air pressure plumbing connections between each subsystem. There is also a process where each subsystem is assembled prior to assembling a photolithography system from the various subsystems. Once a photolithography system is assembled using the various subsystems, a total adjustment is performed to make sure that every accuracy is maintained in the complete photolithography system. Additionally, it is desirable to manufacture an exposure system in a clean room where the temperature and purity are controlled.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A kinematic optical mounting assembly for securing an optical element having a plurality of mounting projections, the kinematic optical mounting assembly comprising:

a base having a periphery and defining an axis;

a plurality of first bracket assemblies secured to the base and adapted to engage the optical element such that each first bracket assembly constrains the optical element from movement relative to the base in a direction substantially parallel to the axis, wherein each first bracket assembly includes:

a bracket body having:

a first arm;

a clamping block disposed on the first arm;

a second arm;

a seat disposed on the second arm, wherein the clamping block and the seat have substantially flat surfaces adapted to engage respective surfaces of the optical element; and a bracket interface extending between the bracket body and the base; and a plurality of second bracket assemblies secured to the base and adapted to engage the optical element such that each second bracket assembly constrains the optical element from movement relative to the base in a direction substantially perpendicular to the axis and substantially tangential to the periphery of the base, wherein the first bracket assemblies and the second bracket assemblies constrain the optical element in no more than six degrees of freedom.

2. The kinematic optical mounting assembly of claim 1, wherein the first bracket assemblies are spaced at substantially equal intervals.

3. The kinematic optical mounting assembly of claim 1, wherein the second bracket assemblies are spaced at substantially equal intervals.

4. The kinematic optical mounting assembly of claim 3, wherein the first bracket assemblies are substantially collocated with respective second bracket assemblies.

5. The kinematic optical mounting assembly of claim 4, wherein each first bracket assembly is adapted to engage a first pair of opposing surfaces of a respective mounting projection and each second bracket assembly is adapted to engage a second pair of opposing surfaces of the respective mounting projection.

6. The kinematic optical mounting assembly of claim 3, wherein the first bracket assemblies are spaced at substantially equal intervals from each other and from the second bracket assemblies.

7. The kinematic optical mounting assembly of claim 6, wherein each first bracket assembly is adapted to engage opposing surfaces of a peripheral edge of the optical element and each second bracket assembly is adapted to engage opposing surfaces of a respective mounting projection.

8. The kinematic optical mounting assembly of claim 1, wherein the first arm comprises an elastic element biasing the clamping block towards the seat.

9. The kinematic optical mounting assembly of claim 8, wherein the elastic element comprises one of a helical spring, a leaf spring, and a Belleville spring.

10. The kinematic optical mounting assembly of claim 1, wherein the clamping block, the seat, and the bracket interface are substantially aligned.

11. The kinematic optical mounting assembly of claim 1, wherein the bracket interface comprises a constraint member and at least one flexure.

12. The kinematic optical mounting assembly of claim 11, wherein the bracket interface comprises a first flexure extending between the bracket body and the constraint member and a second flexure extending between the constraint member and the base.

13. The kinematic optical mounting assembly of claim 11, wherein the bracket interface has a relatively high stiffness in one degree of freedom and a relatively low stiffness in five degrees of freedom.

14. The kinematic optical mounting assembly of claim 1, wherein each second bracket assembly comprises:

a bracket body; and a bracket interface extending between the bracket and the base.

15. The kinematic optical mounting assembly of claim 14, wherein the bracket body comprises:

a first arm;

a clamping block disposed on the first arm;

a second arm;

a seat disposed on the second arm, wherein the clamping block and the seat have substantially flat surfaces adapted to engage respective surfaces of the optical element.

16. The kinematic optical mounting assembly of claim 15, wherein the first arm comprises an elastic element biasing the clamping block towards the seat.

17. The kinematic optical mounting assembly of claim 16, wherein the elastic element comprises one of a helical spring, a leaf spring, and a Belleville spring.

18. The kinematic optical mounting assembly of claim 15, wherein the clamping block, the seat, and the bracket interface are substantially aligned.

19. The kinematic optical mounting assembly of claim 14, wherein the bracket interface comprises a constraint member and at least one flexure.

20. The kinematic optical mounting assembly of claim 19, wherein the bracket interface comprises a first flexure extending between the bracket body and the constraint member and a second flexure extending between the constraint member and the base.

21. The kinematic optical mounting assembly of claim 19, wherein the bracket interface has a relatively high stiffness in one degree of freedom and a relatively low stiffness in five degrees of freedom.

22. The kinematic optical mounting assembly of claim 1, wherein the base has a substantially annular shape.

23. The kinematic optical mounting assembly of claim 1, wherein the base further comprises recesses for receiving respective bracket assemblies.

24. A mounting assembly for mounting an optical element, the mounting assembly comprising:

a base having a periphery and defining an axis;

a plurality of first bracket assemblies secured to the base at substantially equal intervals and adapted to engage the optical element such that each first bracket assembly constrains the optical element from movement relative to the base in a direction substantially parallel to the axis; and a plurality of second bracket assemblies secured to the base at substantially equal intervals and adapted to engage the optical element such that each second bracket assembly constrains the optical element from movement relative to the base in a direction substantially perpendicular to the axis and substantially tangential to the periphery of the base, wherein each first bracket assembly and each second bracket assembly are independent of all other first bracket assemblies and second bracket assemblies.

25. The mounting assembly of claim 24, wherein the first bracket assemblies are substantially collocated with respective second bracket assemblies.

26. The mounting assembly of claim 25, wherein each first bracket assembly is adapted to engage a first pair of opposing surfaces of a respective mounting projection and each second bracket assembly is adapted to engage a second pair of opposing surfaces of the respective mounting projection.

27. The mounting assembly of claim 24, wherein the first bracket assemblies are spaced at substantially equal intervals from each other and from the second bracket assemblies.

28. The mounting assembly of claim 27, wherein each first bracket assembly is adapted to engage opposing surfaces of a peripheral edge of the optical element and each second bracket assembly is adapted to engage opposing surfaces of a respective mounting projection.

29. The mounting assembly of claim 24, wherein each first bracket assembly comprises:

a bracket body; and a bracket interface extending between the bracket and the base.

30. The mounting assembly of claim 29, wherein the bracket body comprises:
   a first arm;
   a clamping block disposed on the first arm;
   a second arm;
   a seat disposed on the second arm, wherein the clamping block and the seat have substantially flat surfaces adapted to engage respective surfaces of the optical element.

31. The mounting assembly of claim 30, wherein the first arm comprises an elastic element biasing the clamping block towards the seat.

32. The mounting assembly of claim 31, wherein the elastic element comprises one of a helical spring, a leaf spring, and a Belleville spring.

33. The mounting assembly of claim 30, wherein the clamping block, the seat, and the bracket interface are substantially aligned.

34. The mounting assembly of claim 29, wherein the bracket interface comprises a constraint member and at least one flexure.

35. The mounting assembly of claim 34 wherein the bracket interface comprises a first flexure extending between the bracket body and the constraint member and a second flexure extending between the constraint member and the base.

36. The mounting assembly of claim 34, wherein the bracket interface has a relatively high stiffness in one degree of freedom and a relatively low stiffness in five degrees of freedom.

37. The mounting assembly of claim 24, wherein each second bracket assembly comprises:
   a bracket body; and
   a bracket interface extending between the bracket and the base.

38. The mounting assembly of claim 37, wherein the bracket body comprises:
   a first arm;
   a clamping block disposed on the first arm;
   a second arm;
   a seat disposed on the second arm, wherein the clamping block and the seat have substantially flat surfaces adapted to engage respective surfaces of the optical element.

39. The mounting assembly of claim 38, wherein the first arm comprises an elastic element biasing the clamping block towards the seat.

40. The mounting assembly of claim 39, wherein the elastic element comprises one of a helical spring, a leaf spring, and a Belleville spring.

41. The mounting assembly of claim 38, wherein the clamping block, the seat, and the bracket interface are substantially aligned.

42. The mounting assembly of claim 37, wherein the bracket interface comprises a constraint member and at least one flexure.

43. The mounting assembly of claim 42, wherein the bracket interface comprises a first flexure extending between the bracket body and the constraint member and a second flexure extending between the constraint member and the base.

44. The mounting assembly of claim 42, wherein the bracket interface has a relatively high stiffness in one degree of freedom and a relatively low stiffness in five degrees of freedom.

45. The mounting assembly of claim 24, wherein the first bracket assemblies and the second bracket assemblies constrain the optical element in no more than six degrees of freedom.

46. The mounting assembly of claim 24, wherein the base has a substantially annular shape.

47. The mounting assembly of claim 24, wherein the base further comprises recesses for receiving respective bracket assemblies.

48. An optical assembly, comprising:
   an optical element having an integral interface structure that includes a peripheral edge and a plurality of mounting projections;
   a base having a periphery and defining an axis;
   a plurality of first bracket assemblies secured to the bases each first bracket assembly comprising:
      a bracket body engaging a respective mounting projection or the peripheral edge of the optical element; and
      a bracket interface extending between the bracket body and the base, wherein each first bracket assembly constrains the optical element from movement relative to the base in a direction substantially parallel to the axis; and
   a plurality of second bracket assemblies secured to the base, each second bracket assembly comprising:
      a bracket body engaging a respective mounting projection; and
      a bracket interface extending between the bracket body and the base,
wherein each second bracket assembly constrains the optical element from movement relative to the base in a direction substantially perpendicular to the axis and substantially tangential to the periphery of the base, wherein the first bracket assemblies and the second bracket assemblies constrain the optical element in no more than six degrees of freedom,
   wherein the second bracket assemblies are spaced at substantially equal intervals.

49. The optical assembly of claim 48, wherein each bracket interface comprises a constraint member and at least one flexure.

50. The optical assembly of claim 49, wherein each bracket interface comprises a first flexure extending between a respective bracket and the constraint member and a second flexure extending between the constraint member and the base.

51. The optical assembly of claim 49, wherein each bracket interface has a relatively high stiffness in one degree of freedom and a relatively low stiffness in five degrees of freedom.

52. The optical assembly of claim 48, wherein the first bracket assemblies are substantially collocated with respective second bracket assemblies.

53. The optical assembly of claim 52, wherein each first bracket assembly engages a first pair of opposing surfaces of a respective mounting projection and each second bracket assembly engages a second pair of opposing surfaces of the respective mounting projection.

54. The optical assembly of claim 48, wherein the first bracket assemblies are spaced at substantially equal intervals from each other and from the second bracket assemblies.

55. The optical assembly of claim 54, wherein each first bracket assembly engages opposing surfaces of the peripheral edge of the optical element and each second bracket assembly engages opposing surfaces of a respective mounting projection.

56. An optical assembly, comprising:
an optical element having an integral interface structure that includes a peripheral edge and a plurality of mounting projections;
a base having a periphery and defining an axis;
a plurality of first bracket assemblies secured to the base, each first bracket assembly comprising:
   a bracket body engaging a respective mounting projection or the peripheral edge of the optical element; and
   a bracket interface extending between the bracket body and the base, wherein each first bracket assembly constrains the optical element from movement relative to the base in a direction substantially parallel to the axis; and
a plurality of second bracket assemblies secured to the base, each second bracket assembly comprising:
   a bracket body engaging a respective mounting projection; and
   a bracket interface extending between the bracket body and the base,
wherein each second bracket assembly constrains the optical element from movement relative to the base in a direction substantially perpendicular to the axis and substantially tangential to the periphery of the base, wherein the first bracket assemblies and the second bracket assemblies constrain the optical element in no more than six degrees of freedom,
   wherein each bracket body comprises:
      a first arm;
      a clamping block disposed on the first arm;
      a second arm; and
      a seat disposed on the second arm, wherein the clamping block and the seat have substantially flat surfaces to engage respective surfaces of the optical element.

57. The optical assembly of claim 56, wherein the first arm comprises an elastic element biasing the clamping block towards the seat.

58. The optical assembly of claim 57, wherein the elastic element comprises one of a helical spring, a leaf spring, and a Belleville spring.

59. The optical assembly of claim 56, wherein in the first bracket assemblies and in the second bracket assemblies the clamping block, the seat, and the bracket interface are substantially aligned.

60. The optical assembly of claim 48, wherein the base has a substantially annular shape.

61. An optical assembly, comprising:
an optical element having an integral interface structure that includes a peripheral edge and a plurality of mounting projections;
a base having a periphery and defining an axis;
a plurality of first bracket assemblies secured to the base, each first bracket assembly comprising:
   a bracket body engaging a respective mounting projection or the peripheral edge of the optical element; and
   a bracket interface extending between the bracket body and the base, wherein each first bracket assembly constrains the optical element from movement relative to the base in a direction substantially parallel to the axis; and
a plurality of second bracket assemblies secured to the base, each second bracket assembly comprising:
   a bracket body engaging a respective mounting projection; and
   a bracket interface extending between the bracket body and the base,
wherein each second bracket assembly constrains the optical element from movement relative to the base in a direction substantially perpendicular to the axis and substantially tangential to the periphery of the base, wherein the first bracket assemblies and the second bracket assemblies constrain the optical element in no more than six degrees of freedom,
   wherein the base further comprises recesses for receiving respective bracket assemblies.

62. The optical assembly of claim 48, wherein the optical element has a substantially circular cross-section.

63. An optical assembly, comprising:
an optical element having an integral interface structure that includes a peripheral edge and a plurality of mounting projections;
a base having a periphery and defining an axis;
a plurality of first bracket assemblies secured to the base, each first bracket assembly comprising:
   a bracket body engaging a respective mounting projection or the peripheral edge of the optical element; and
   a bracket interface extending between the bracket body and the base, wherein each first bracket assembly constrains the optical element from movement relative to the base in a direction substantially parallel to the axis; and
a plurality of second bracket assemblies secured to the base, each second bracket assembly comprising:
   a bracket body engaging a respective mounting projection; and
   a bracket interface extending between the bracket body and the base,
wherein each second bracket assembly constrains the optical element from movement relative to the base in a direction substantially perpendicular to the axis and substantially tangential to the periphery of the base, wherein the first bracket assemblies and the second bracket assemblies constrain the optical element in no more than six degrees of freedom,
   wherein the optical element is a bi-reflective mirror.

64. A catadioptric optical system utilizing the optical assembly of claim 63.

65. A lithography system utilizing the catadioptric optical system of claim 64.

66. The kinematic optical mounting assembly of claim 1, wherein the first bracket assemblies and the second bracket assemblies constrain the optical element in six degrees of freedom.

67. A kinematic optical mounting assembly for securing an optical element having a plurality of mounting projections and a central axis, the kinematic optical mounting assembly comprising:
a base having a periphery and defining an axis;
a plurality of first bracket assemblies secured to the base and adapted to engage the optical element such that each first bracket assembly constrains the optical element from movement relative to the base in a direction substantially parallel to the axis; and
a plurality of second bracket assemblies secured to the base and adapted to engage the optical element such that each second bracket assembly constrains the optical element from movement relative to the base in a direction substantially perpendicular to the axis and substantially tangential to the periphery of the base, wherein the first bracket assemblies and the second bracket assemblies constrain the optical element in no more than six degrees of freedom, while allowing for radial expansion and contraction of the optical element relative to the central axis.

68. The kinematic optical mounting assembly of claim 67, wherein at least one of the first and second bracket assemblies is adapted to engage a first pair of opposing surfaces of at least one of the plurality of mounting projections.

69. The kinematic optical mounting assembly of claim 67, wherein at least one of the first and second first bracket assemblies is adapted to engage opposing surfaces of a peripheral edge of the optical element.

70. The kinematic optical mounting assembly of claim 67, wherein at least one of the first and second bracket assemblies comprises:
   a bracket body; and
   a bracket interface extending between the bracket body and the base.

71. The kinematic optical mounting assembly of claim 70, wherein the bracket body comprises:
   a first arm;
   a clamping block disposed on the first arm;
   a second arm;
   a seat disposed on the second arm, wherein the clamping block and the seat have substantially flat surfaces adapted to engage respective surfaces of the optical element.

72. The kinematic optical mounting assembly of claim 71, wherein the first arm comprises an elastic element biasing the clamping block towards the seat.

73. The kinematic optical mounting assembly of claim 71, wherein the bracket interface comprises a constraint member and at least one flexure.

74. The kinematic optical mounting assembly of claim 71, wherein the bracket interface comprises a first flexure extending between the bracket body and the constraint member and a second flexure extending between the constraint member and the base.

75. The kinematic optical mounting assembly of claim 71, wherein the bracket interface has a relatively high stiffness in one degree of freedom and a relatively low stiffness in five degrees of freedom.

76. The kinematic optical mounting assembly of claim 67, wherein the base has a substantially annular shape.

77. The kinematic optical mounting assembly of claim 67, wherein the first bracket assemblies and the second bracket assemblies constrain the optical element in six degrees of freedom.

* * * * *